(12) United States Patent
Amidei et al.

(10) Patent No.: US 8,997,254 B2
(45) Date of Patent: Mar. 31, 2015

(54) SYSTEMS AND METHODS FOR FAST STARTUP STREAMING OF ENCRYPTED MULTIMEDIA CONTENT

(71) Applicant: Sonic IP, Inc., Santa Clara, CA (US)

(72) Inventors: William Amidei, La Jolla, CA (US); Jason Braness, San Diego, CA (US); Kourosh Soroushian, San Diego, CA (US); Eric Grab, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 82 days.

(21) Appl. No.: 13/631,083

(22) Filed: Sep. 28, 2012

(65) Prior Publication Data
US 2014/0096269 A1 Apr. 3, 2014

(51) Int. Cl.
G06F 7/04 (2006.01)
H04L 29/06 (2006.01)
G06F 21/10 (2013.01)

(52) U.S. Cl.
CPC ............... *H04L 63/10* (2013.01); *G06F 21/10* (2013.01); *H04L 63/0435* (2013.01); *H04L 63/062* (2013.01); *H04L 63/0807* (2013.01)
USPC .......................................................... 726/29

(58) Field of Classification Search
CPC ....... G06F 21/10; H04L 63/10; H04L 63/062; H04L 63/087
USPC .......................................................... 726/29
See application file for complete search history.

(56) References Cited

U.S. PATENT DOCUMENTS

| | | |
|---|---|---|
| 5,361,332 A | 11/1994 | Yoshida et al. |
| 5,404,436 A | 4/1995 | Hamilton |
| 5,715,403 A | 2/1998 | Stefik |
| 6,031,622 A | 2/2000 | Ristow et al. |
| 6,141,754 A | 10/2000 | Choy |
| 6,195,388 B1 | 2/2001 | Choi et al. |
| 6,658,056 B1 | 12/2003 | Duruö z et al. |
| 6,807,306 B1 | 10/2004 | Girgensohn et al. |
| 6,859,496 B1 | 2/2005 | Boroczky et al. |
| 6,956,901 B2 | 10/2005 | Boroczky et al. |
| 7,242,772 B1 | 7/2007 | Tehranchi |
| 7,421,411 B2 | 9/2008 | Kontio et al. |
| 7,478,325 B2 | 1/2009 | Foehr |

(Continued)

FOREIGN PATENT DOCUMENTS

| | | |
|---|---|---|
| EP | 813167 A2 | 12/1997 |
| WO | 2004102571 A1 | 11/2004 |

(Continued)

OTHER PUBLICATIONS

"IBM Closes Cryptolopes Unit," Dec. 17, 1997, CNET News, Retrieved from http://news.cnet.com/IBM-closes-Cryptolopes-unit/2100-1001_3206465.html, 3 pages (Continued)

*Primary Examiner* — Techane Gergiso
(74) *Attorney, Agent, or Firm* — KPPB LLP

(57) ABSTRACT

Methods and systems to allow for the streaming of media from a file server to a client, where the streaming occurs concurrently with the execution of an information security protocol. The security protocol allows the client to securely receive one or more keys that allow the client to access the media. This permits a user to access the media sooner than would otherwise be possible, while allowing timely performance of security related processing.

18 Claims, 5 Drawing Sheets

(56) References Cited

U.S. PATENT DOCUMENTS

| | | | |
|---|---|---|---|
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,311,115 B2 | 11/2012 | Gu et al. | |
| 8,321,556 B1 | 11/2012 | Chatterjee et al. | |
| 8,386,621 B2 | 2/2013 | Park | |
| 8,412,841 B1 | 4/2013 | Swaminathan et al. | |
| 8,456,380 B2 | 6/2013 | Pagan | |
| 8,472,792 B2 | 6/2013 | Butt | |
| 8,806,188 B2 * | 8/2014 | Braness et al. | 713/150 |
| 2003/0002578 A1 | 1/2003 | Tsukagoshi et al. | |
| 2003/0065777 A1 | 4/2003 | Mattila et al. | |
| 2003/0152370 A1 | 8/2003 | Otomo et al. | |
| 2003/0231863 A1 | 12/2003 | Eerenberg et al. | |
| 2003/0231867 A1 | 12/2003 | Gates et al. | |
| 2003/0236836 A1 | 12/2003 | Borthwick | |
| 2003/0236907 A1 | 12/2003 | Stewart et al. | |
| 2004/0024688 A1 * | 2/2004 | Bi et al. | 705/37 |
| 2004/0039916 A1 | 2/2004 | Aldis et al. | |
| 2004/0136698 A1 | 7/2004 | Mock | |
| 2005/0038826 A1 | 2/2005 | Bae et al. | |
| 2005/0114896 A1 * | 5/2005 | Hug et al. | 725/88 |
| 2005/0149450 A1 | 7/2005 | Stefik et al. | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0100757 A1 | 5/2007 | Rhoads | |
| 2007/0136817 A1 * | 6/2007 | Nguyen | 726/26 |
| 2007/0140647 A1 | 6/2007 | Kusunoki et al. | |
| 2007/0154165 A1 | 7/2007 | Hemmeryckx-Deleersnijder et al. | |
| 2007/0168541 A1 | 7/2007 | Gupta et al. | |
| 2007/0180125 A1 | 8/2007 | Knowles et al. | |
| 2007/0185982 A1 | 8/2007 | Nakanowatari et al. | |
| 2007/0239839 A1 | 10/2007 | Buday et al. | |
| 2007/0292107 A1 | 12/2007 | Yahata et al. | |
| 2008/0066181 A1 | 3/2008 | Haveson et al. | |
| 2008/0101466 A1 | 5/2008 | Swenson et al. | |
| 2008/0126248 A1 | 5/2008 | Lee et al. | |
| 2008/0137736 A1 | 6/2008 | Richardson et al. | |
| 2008/0192818 A1 | 8/2008 | DiPietro et al. | |
| 2008/0256105 A1 | 10/2008 | Nogawa et al. | |
| 2008/0263354 A1 | 10/2008 | Beuque | |
| 2008/0279535 A1 | 11/2008 | Haque et al. | |
| 2008/0310496 A1 | 12/2008 | Fang | |
| 2009/0031220 A1 | 1/2009 | Tranchant et al. | |
| 2009/0037959 A1 | 2/2009 | Suh et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0132824 A1 * | 5/2009 | Terada et al. | 713/175 |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0226148 A1 | 9/2009 | Nesvadba et al. | |
| 2009/0228395 A1 | 9/2009 | Wegner et al. | |
| 2009/0293116 A1 | 11/2009 | DeMello | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0040351 A1 | 2/2010 | Toma et al. | |
| 2010/0083322 A1 * | 4/2010 | Rouse | 725/93 |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0138903 A1 | 6/2010 | Medvinsky | |
| 2010/0158109 A1 | 6/2010 | Dahlby et al. | |
| 2010/0189183 A1 | 7/2010 | Gu et al. | |
| 2010/0228795 A1 | 9/2010 | Hahn | |
| 2010/0235472 A1 | 9/2010 | Sood et al. | |
| 2011/0047209 A1 * | 2/2011 | Lindholm et al. | 709/203 |
| 2011/0078440 A1 | 3/2011 | Feng et al. | |
| 2011/0080940 A1 | 4/2011 | Bocharov | |
| 2011/0082924 A1 * | 4/2011 | Gopalakrishnan | 709/223 |
| 2011/0126191 A1 | 5/2011 | Hughes et al. | |
| 2011/0129011 A1 | 6/2011 | Cilli et al. | |
| 2011/0142415 A1 | 6/2011 | Rhyu | |
| 2011/0150100 A1 | 6/2011 | Abadir | |
| 2011/0153785 A1 | 6/2011 | Minborg et al. | |
| 2011/0225417 A1 * | 9/2011 | Maharajh et al. | 713/150 |
| 2011/0239078 A1 | 9/2011 | Luby et al. | |
| 2011/0246659 A1 | 10/2011 | Bouazizi | |
| 2011/0268178 A1 | 11/2011 | Park | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2011/0314500 A1 | 12/2011 | Gordon et al. | |
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0265562 A1 | 10/2012 | Daouk et al. | |
| 2012/0278496 A1 | 11/2012 | Hsu | |
| 2012/0307883 A1 | 12/2012 | Graves | |
| 2013/0044821 A1 | 2/2013 | Braness et al. | |
| 2013/0046902 A1 | 2/2013 | Villegas Nuñez et al. | |
| 2013/0054958 A1 | 2/2013 | Braness et al. | |
| 2013/0061045 A1 | 3/2013 | Kiefer et al. | |
| 2013/0166906 A1 * | 6/2013 | Swaminathan et al. | 713/155 |
| 2013/0179199 A1 | 7/2013 | Ziskind et al. | |
| 2013/0179992 A1 | 7/2013 | Ziskind et al. | |
| 2013/0226635 A1 | 8/2013 | Fisher | |
| 2014/0101722 A1 * | 4/2014 | Moore | 726/4 |

FOREIGN PATENT DOCUMENTS

| | | | |
|---|---|---|---|
| WO | 2009065137 A1 | 5/2009 |
| WO | 2010060106 A1 | 5/2010 |
| WO | 2010122447 A1 | 10/2010 |
| WO | 2012094171 A1 | 7/2012 |
| WO | 2012094181 A2 | 7/2012 |
| WO | 2012094189 A1 | 7/2012 |
| WO | 2013103986 A2 | 7/2013 |

OTHER PUBLICATIONS

"Supported Media Formats", Supported Media Formats, Android Developers, Nov. 27, 2013, 3 pages.

European Search Report for Application 11855237.1, Search Completed Jun. 12, 2014, 9 pages.

Federal Computer Week, "Tool Speeds Info to Vehicles", Jul. 25, 1999, 5 pages.

HTTP Live Streaming Overview, Networking & Internet, Apple, Inc., Apr. 1, 2011, 38 pages.

Informationweek: Front End: Daily Dose, "Internet on Wheels", Jul. 20, 1999, 3 pages.

(56) References Cited

OTHER PUBLICATIONS

International Search Report and Written Opinion for International Application PCT/US2011/066927, International Filing Date Dec. 22, 2011, Report Completed Apr. 3, 2012, Mailed Apr. 20, 2012, 14 pages.

International Search Report and Written Opinion for International Application PCT/US2011/067167, International Filing Date Dec. 23, 2011, Report Completed Jun. 19, 2012, Mailed Jul. 2, 2012, 11 pages.

International Search Report and Written Opinion for International Application PCT/US2013/020572, International Filing Date Jan. 7, 2013, Search Completed Mar. 19, 2013, Mailed Apr. 29, 2013. 10 pages.

ITS International, "Fleet System Opts for Mobile Server", Aug. 26, 1999, 1 page.

"Adaptive Streaming Comparison", Jan. 28, 2010, 5 pages.

"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for... -a018239381, 6 pages.

"Transcoding Best Practices", From movideo, Nov. 27, 2013, 5 pages.

Akhshabi et al., "An Experimental Evaluation of Rate-Adaptation Algorithms in Adaptive Streaming over HTTP", MMSys'11, Feb. 24-25, 2011, 12 pages.

Anonymous, "Method for the Encoding of a Compressed Video Sequence Derived from the Same Video Sequence Compressed at a Different Bit Rate Without Loss of Data", ip.com, ip.com No. IPCOM000008165D, May 22, 2012, pp. 1-9.

Author Unknown, "Tunneling QuickTime RTSP and RTP over HTTP", Published by Apple Computer, Inc.: 1999 (month unknown), 6 pages.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pages.

Gannes, "The Lowdown on Apple's HTTP Adaptive Bitrate Streaming", GigaOM, Jun. 10, 2009, 12 pages.

Kim, Kyuheon, "MPEG-2 ES/PES/TS/PSI", Kyung-Hee University, Oct. 4, 2010, 66 pages.

Nelson, "Smooth Streaming Deployment Guide", Microsoft Expression Encoder, Aug. 2010, 66 pages.

Nelson, Michael, "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.

Noé, Alexander, "Matroska File Format (under construction !)", Jun. 24, 2007, XP002617671, Retrieved from: URL:http://web.archive.org/web/20070821155146/www.matroska.org/technical/specs/matroska.pdf on Jan. 19, 2011, pp. 1-51.

Ooyala, "Widevine Content Protection." Ooyala Support Center for Developers. Ooyala, Inc., 2013. Jun. 3, 2013. http://support.ooyala.com/developers/documentation/concepts/player_v3_widevine_integration.html.

Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pages.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pages.

Pantos, "HTTP Live Streaming: draft-pantos-http-live-streaming-06", Published by the Internet Engineering Task Force (IETF), Mar. 31, 2011, 24 pages.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pages.

Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.

Siglin, "HTTP Streaming: What You Need to Know", streamingmedia.com, 2010, 16 pages.

Siglin, "Unifying Global Video Strategies, MP4 File Fragmentation for Broadcast, Mobile and Web Delivery", Nov. 16, 2011, 16 pages.

Wu, Feng et al., "Next Generation Mobile Multimedia Communications: Media Codec and Media Transport Perspectives", In China Communications, Oct. 2006, pp. 30-44.

Zambelli, Alex, "IIS Smooth Streaming Technical Overview", Microsoft Corporation, Mar. 2009.

\* cited by examiner

SYSTEMS AND METHODS FOR FAST STARTUP STREAMING OF ENCRYPTED MULTIMEDIA CONTENT

BACKGROUND

The streaming of media from a server is now a common practice. There is, however, a need to control who may access the media and the circumstances under which the media is accessed. Typically, a user and/or his computing device may need to be authorized to access certain media. A user may need to be a valid account holder, and may need to have paid for the media, for example.

As a result, media owners and distributors now commonly implement digital rights management (DRM) in an effort to control access. DRM may include the use of cryptography for purposes of encrypting and decrypting media, and for authentication purposes. To implement this, key distribution and key management protocols may be put into place. The appropriate key(s) need to be provided securely to the authorized party, and to that party only. With the proper key(s), an authorized user may then decrypt and otherwise access a media stream.

While this may allow for a secure transaction, such processing may be time-consuming. Communications may have to take place between a client and a trusted agent of the media owner or distributor (e.g., a license server) in order to establish a user's right to access the media and to secure the media from unauthorized users. The time and effort required to implement such a secure transaction may diminish a user's experience. The user chooses to access certain media, and then typically wants to see the media with minimal delay. DRM processes, while necessary, may slow down media delivery.

BRIEF DESCRIPTION OF THE DRAWINGS/FIGURES

Figure 1:
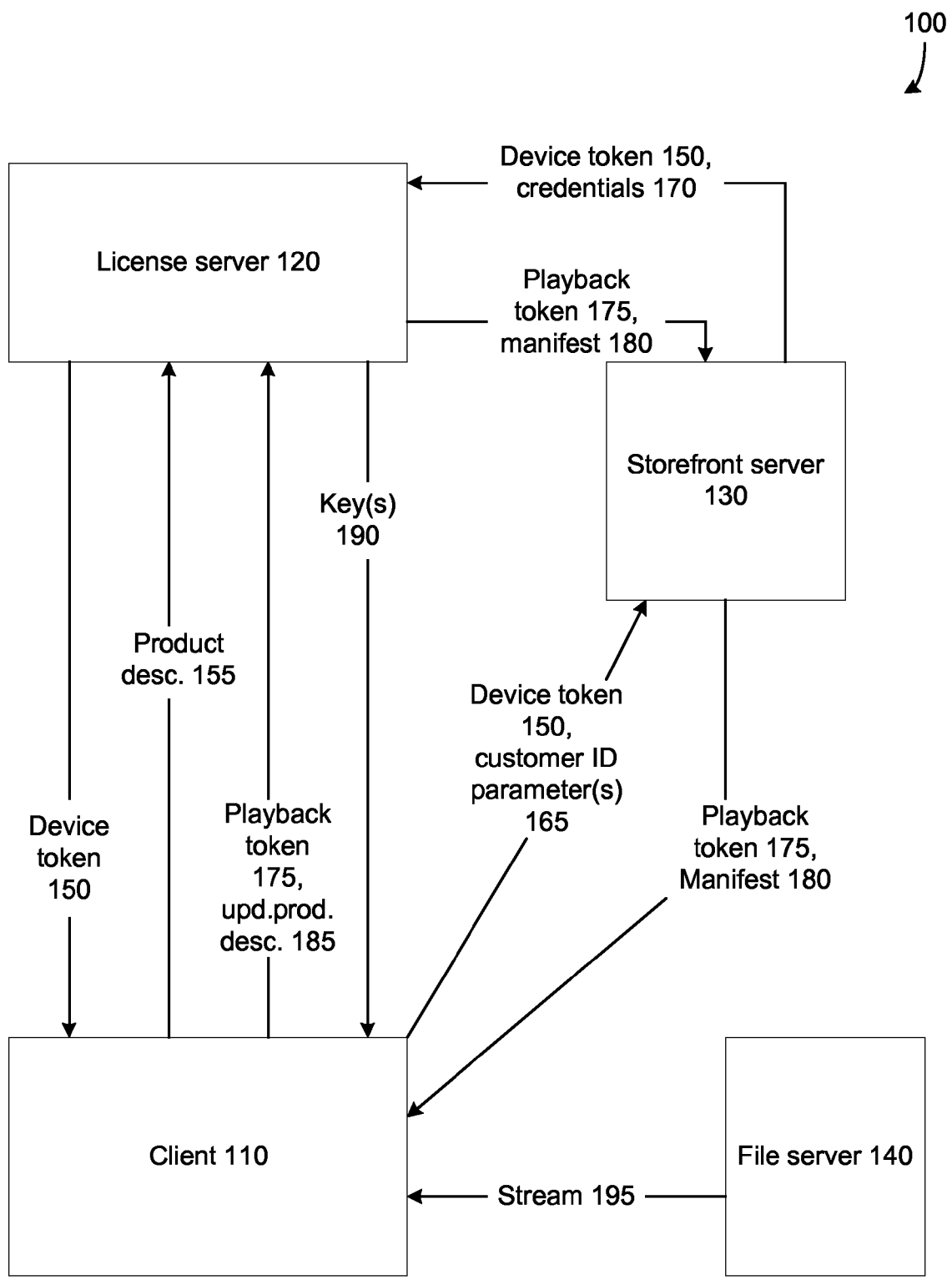
FIG. 1 is a block diagram of a system that implements the processing described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The systems and processes described herein allow for the streaming of media from a file server to a client, where the streaming occurs concurrently with the execution of an information security protocol. This permits a user to access the media sooner than would otherwise be possible, while allowing timely performance of security related processing.

The overall processing of the system described herein is shown in FIG. 1, according to an embodiment. Initially, a client 110 interacts with a license server 120. The license server 120 assigns a unique identifier to the client 110, where this identifier takes the form of a device token 150. The device token 150 may be received from license server 120 at client 110. In an embodiment, device token 150 is saved in persistent storage in client 110. The client 110 may also have a product description 155, which represents device capability information about the client device 110. The license server 120 may receive and use this information to determine the types of multimedia streams that client 110 is able to process. In an embodiment, the product description 155 can be cached at the license server 120 and associated with the device token 150.

When the client 110 requests a media stream, the device token 150 is sent to a storefront server 130. In an embodiment, this may take place via a storefront application running on client 110 (not shown). In an embodiment, one or more customer identification parameters 165 are also sent to the storefront server 130. These parameters may include device-specific identification information, such as a MAC address, which the storefront server 130 may use to retrieve user account information (such as a user's email address, user ID, and/or password). In an alternative embodiment, the customer ID parameters 165, as sent to the storefront server 130, may include the actual user ID and password.

In either case, the user ID, email address, and/or password will eventually be sent from the storefront server 130 to the license server 120 as credentials 170. The storefront server 130 forwards the device token 150 with the credentials 170 to the license server 120. The license server then looks up the device token 150 and reads the last known product description associated with this device token. The license server 120 then provides a playback token 175 and a media manifest 180 to the storefront server 130. As will be described below, the playback token 175 will be used as a mechanism for asserting that the client 110 is authorized to receive the requested media.

In an embodiment, the manifest 180 is a synchronized multimedia integration language (SMIL) file. The playback token 175 and manifest 180 are then sent by the storefront server 130 to the client 110.

In an embodiment, the playback token 175 and manifest 180 are provided to logic running in client 110. In an embodiment, this logic is incorporated in a larger set of software modules referred to herein as a playback stack (not shown). Logic in the playback stack is capable of communicating with the license server 120 and with a file server 140. The playback stack begins streaming media (shown as stream 195) from the file server 140. Concurrently, the playback stack of client 110 initiates an information security protocol with the license server 120. In an embodiment, this protocol takes the form of a secure session with the license server 120. In this secure session, the playback token 175 is sent to the license server 120. In an embodiment, an updated product description 185 is also sent to the license server 120. One or more cryptographic keys 190 may then be provided by the license server 120 to client 110. In an embodiment, the key(s) 190 are used to decrypt the encrypted media in stream 195. In an embodiment, one or more of key(s) 190 may themselves be encrypted, requiring their decryption before use. One or more of key(s) may also be used in an authentication process with file server 140 in an embodiment. As would be understood by a person of ordinary skill in the art, the cryptographic processes used herein may use symmetrical or asymmetrical keys, and the processing may incorporate public key operations such as the Rivest Shamir Adleman (RSA) or Diffie Hellman processes, and/or conventional cryptography such as the Data Encryption Standard (DES) or the Advanced Encryption Standard (AES) algorithms.

In an embodiment, the playback token 175 and the manifest 180 may be cached at client 110. This allows these items to be used by the client 110 to initiate a secure session with the license server at a later time.

Figure 2:
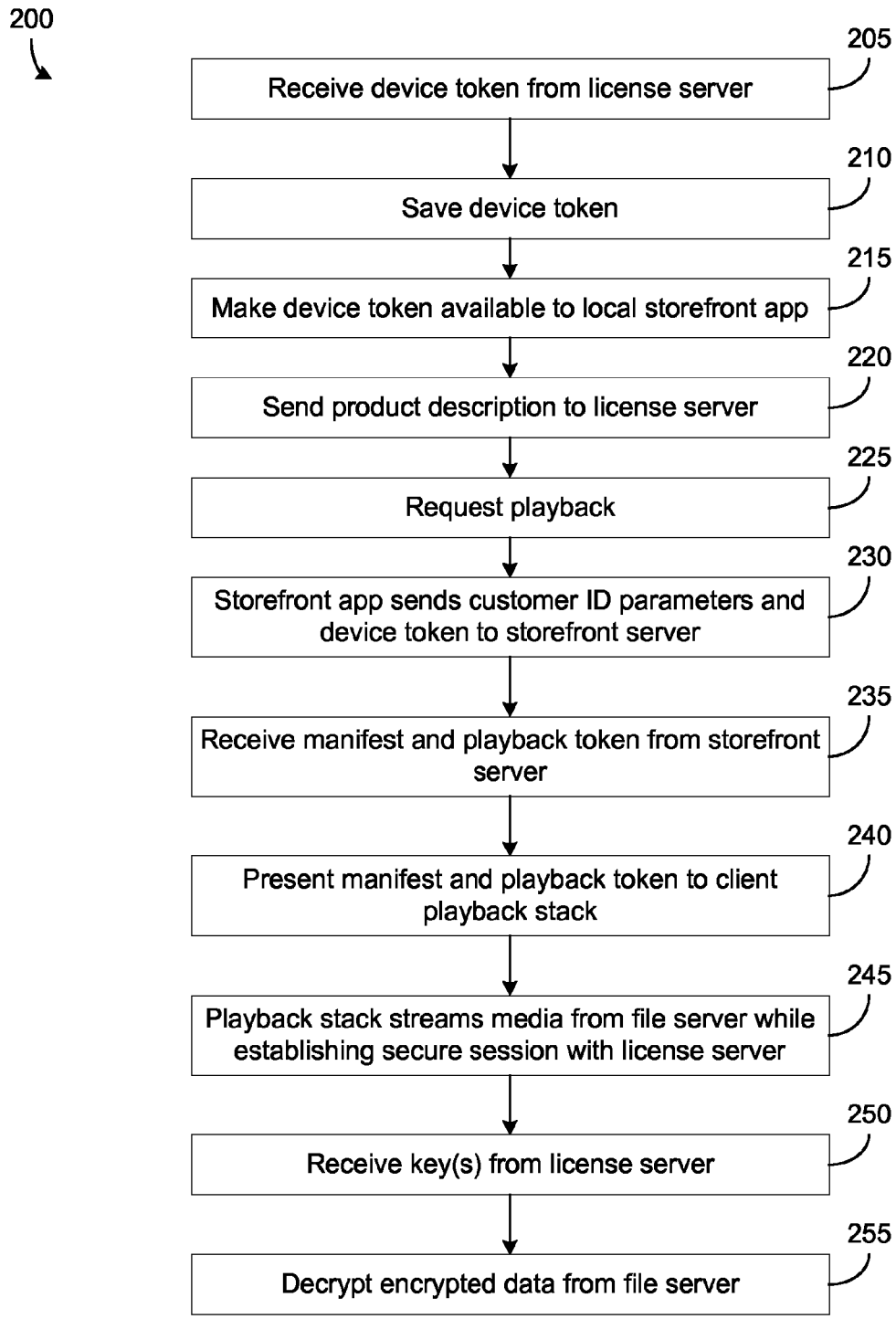
FIG. 2 is a flowchart illustrating processing at a client, according to an embodiment.

Processing at the client 110 is illustrated in FIG. 2, according to an embodiment. At 205, a device token is received at the client from the license server. At 210, the device token is saved in persistent memory. At 215, the device token is made available to a storefront application that is local to the client. At 220, the client sends to the license server a product description that describes the capabilities of the client.

At 225, the client requests playback of a media stream. At 230, the storefront application sends customer identification parameters and the device token to the storefront server. At 235, the client receives a manifest and a playback token from the storefront server. As noted above, in an embodiment the manifest is a SMIL file. In an embodiment, the playback token and the manifest may be cached at the client for later use, as noted above. At 240, the manifest and playback token are presented to the client's playback stack. At 245, the playback stack streams media from the file server while concurrently establishing a secure session with the license server using the playback token. As described above, the establishment of this secure session includes sending the playback token to the license server and may also include sending an updated product description to the license server. At 250, as part of the secure session, one or more keys may be received from the license server. At 255, encrypted data from the file server may be decrypted at the client.

Figure 3:
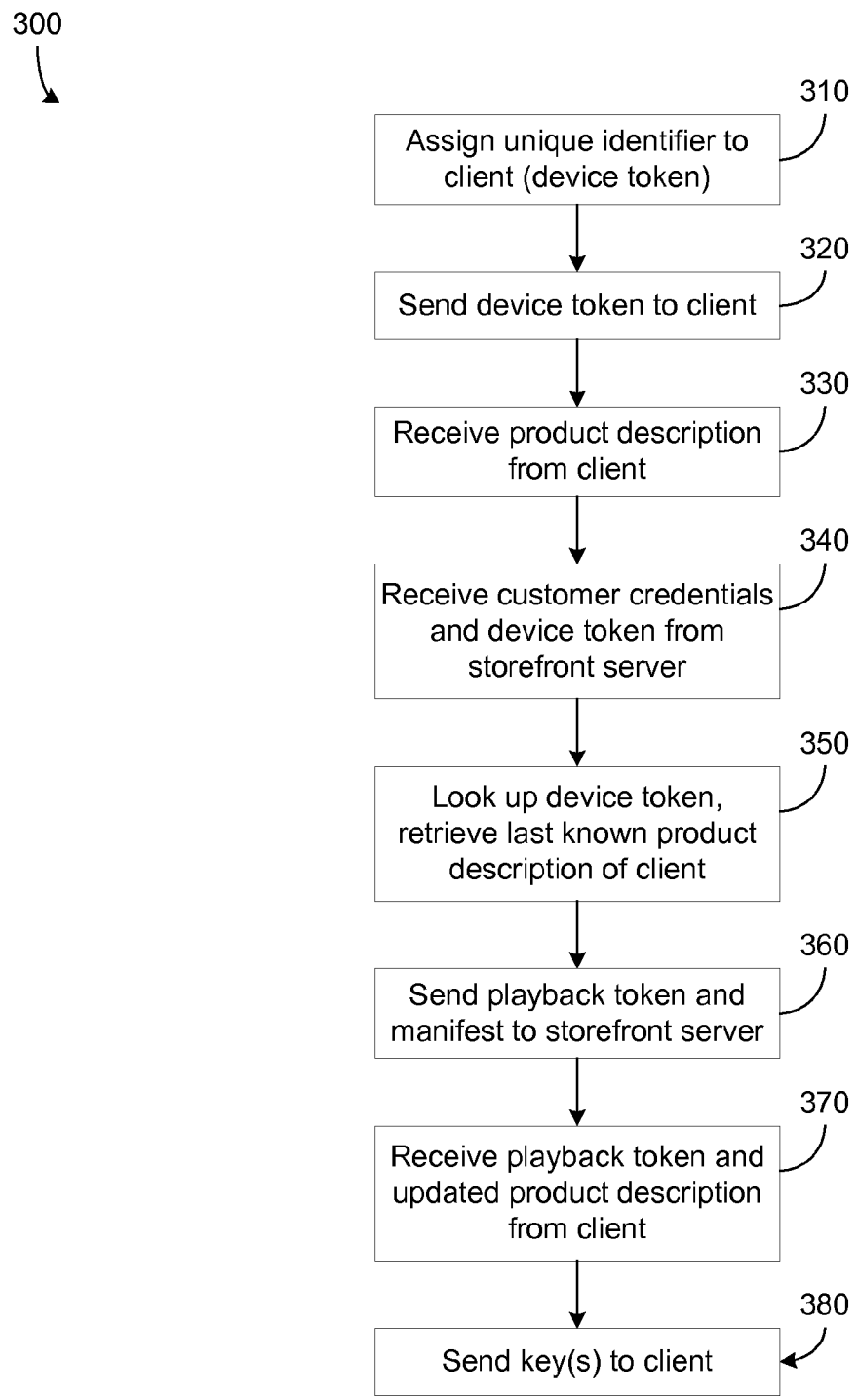
FIG. 3 is a flowchart illustrating processing at a license server, according to an embodiment.

Processing at the license server is illustrated in FIG. 3, according to an embodiment. At 310, the license server assigns a unique identifier to the client, embodying the identifier in a device token. At 320, the device token is provided to the client. At 330, the license server receives a product description from the client, where the product description describes the capabilities of the client and, by extension, describes the media streams that may be processed by the client.

At 340 the license server receives customer credentials and the device token from the storefront server. Recall that these items are provided to the storefront server by the client when the user requests playback. At 350, the last known product description of the client is accessed at the license server. In an embodiment, this description is located at the license server by using client identification information in the device token. At 360 the playback token and a manifest are sent to the storefront server. The storefront server will provide these to the client.

The license server and the client then engage in a secure session. As part of this session, the playback token is received at the license server from the client. In an embodiment, the license server also receives an updated product description from the client. At 380, the license server sends one or more keys to the client. The keys allow the client to decrypt the encrypted media, the streaming of which was initiated by the client concurrently with the initiation of the secure session.

Figure 4:
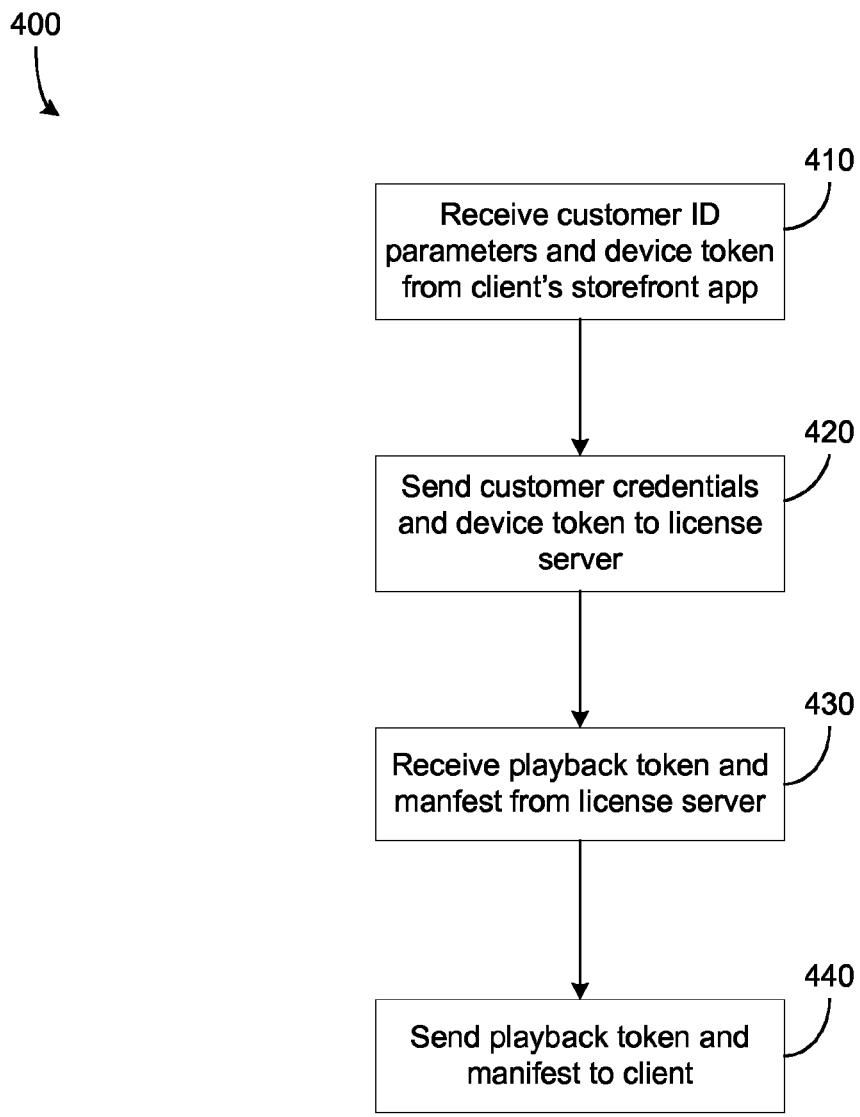
FIG. 4 is a flowchart illustrating processing at a storefront server, according to an embodiment.

Processing at the storefront server is illustrated in FIG. 4, according to an embodiment. When a user requests playback, the storefront server receives customer ID parameters and the device token from the client at 410. In an embodiment, these items are provided by a storefront application at the client. At 420, the storefront server sends customer credentials and the device token to the license server. At 430, the storefront receives the license server's response, i.e., the playback token and manifest. At 440, the storefront server sends the playback token and manifest to the client. In an embodiment, the playback token and the manifest may be cached at the client as noted above. This allows these items to be used by the client to initiate a secure session with the license server at a later time.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

Figure 5:
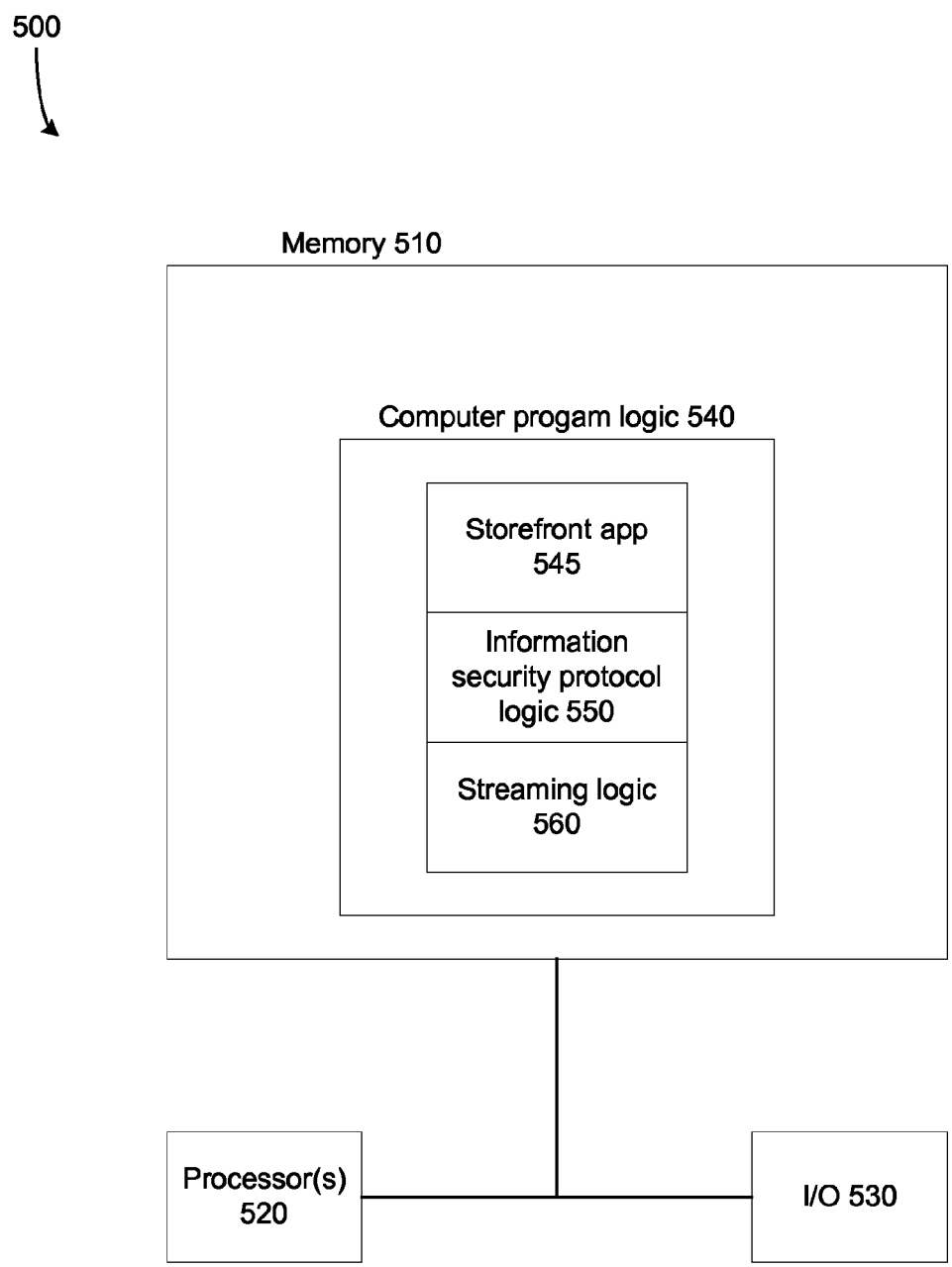
FIG. 5 is a block diagram illustrating a computing system of the client, according to an embodiment.

A client that performs the processing described above with respect to FIG. 2 may incorporate a programmable computing system. Such a computing system executes software/firmware embodying the above processing. Such a system is shown in FIG. 5, according to an embodiment. The illustrated system 500 may include one or more processor(s) 520 and may further include a body of memory 510. Processor(s) 520 may include one or more central processing unit cores. Memory 510 may include one or more computer readable media that may store computer program logic 540. Memory 510 may be implemented as a hard disk and drive, a removable media such as a compact disk, a read-only memory (ROM) or random access memory (RAM) device, for example, or some combination thereof. Processor(s) 520 and memory 510 may be in communication using any of several technologies known to one of ordinary skill in the art, such as a bus or point-to-point interconnect. Computer program logic 540 contained in memory 510 may be read and executed by processor(s) 520. One or more I/O ports and/or I/O devices, shown collectively as I/O 530, may also be connected to processor(s) 520 and memory 510. In an embodiment, one or more I/O devices 530 are used to receive and/or send communications with the license server, storefront server, and file server.

In the illustrated embodiment, computer program logic 540 includes storefront app 545, which is responsible for communicating with the storefront server. The storefront app 545 provides the device token and customer ID parameter(s) to the storefront server, and receives the playback token and manifest from this server.

Computer program logic 540 also includes information security protocol logic 550. This logic module is responsible for initiating and executing a secure session with the license server. As described above, this session includes the sending of a playback token to the license server and the receipt of one or more cryptographic keys. In an embodiment, the key(s)

received from the license server may be themselves encrypted, requiring decryption at the client before they may be used.

Computer program logic 540 also includes streaming logic 560. This logic module is responsible for performing streaming operations in conjunction with the file server. The streaming process includes the use by the client of the above key(s) to decrypt the encrypted streamed media. Other key(s) may be used for authentication purposes with the file server from which the encrypted media stream is received. Some or all of information security protocol logic 550 and streaming logic 560 may be implemented in a playback stack (not shown), as discussed above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

What is claimed is:

1. A method of media streaming, comprising:
   receiving, by a client, a device token from a license server, wherein the device token uniquely identifies the client;
   sending the device token from the client to a storefront server;
   sending the device token from the storefront server to the license server;
   sending a playback token and a manifest from the license server to the storefront server in response to receiving the device token from the storefront server;
   receiving, by the client, the playback token and the manifest from the storefront server; and
   concurrently receiving, by the client, streamed encrypted media from a file server and engaging, by the client, in an information security protocol with the license server, wherein the information security protocol results in the client's ability to access the media;
   wherein engaging in the information security protocol comprises:
      sending the playback token from the client to the license server; and
      receiving, by the client, one or more cryptographic keys from the license server.

2. The method of claim 1, wherein the manifest comprises a synchronized multimedia integration language (SMIL) file.

3. The method of claim 1, wherein the one or more cryptographic keys allow the client to authenticate itself to a file server from which the media is streamed.

4. The method of claim 1, wherein the one or more cryptographic keys allow the client to decrypt the encrypted media.

5. The method of claim 1, further comprising:
   sending updated device capability information to the license server with the playback token.

6. The method of claim 1, further comprising:
   at the client, sending device capability information to the license server,
   performed before said sending of the device token to the storefront server.

7. The method of claim 1, wherein customer identification (ID) parameters are sent with the device token to the storefront server.

8. The method of claim 1, wherein the manifest and playback token are obtained by the storefront server from the license server after the storefront server sends the device token received from the client, to the license server.

9. The method of claim 1, wherein the playback token and manifest are cached at the client after said receipt from the storefront server.

10. A system for media streaming, the system comprising:
    a client comprising:
       a first processor; and
       a first memory in communication with said first processor, said first memory for storing a first plurality of processing instructions configured to direct said first processor to:
          receive a device token from a license server, wherein the device token uniquely identifies the client;
          send the device token to a storefront server;
          receive a playback token and a manifest from the storefront server; and
          concurrently receive streamed encrypted media from a file server and engage in an information security protocol with the license server, wherein the information security protocol results in the client's ability to access the media;
       wherein said instructions configured to direct said processor to engage in the information security protocol comprise instructions configured to direct said processor to:
          send the playback token from the client to the license server; and
          receive, at the client, one or more cryptographic keys from the license server; and
    a license server comprising:
       a second processor; and
       a second memory in communication with said second processor, said second memory for storing a second plurality of processing instructions configured to direct said second processor to:
          receive the device token from the storefront server;
          send the playback token and the manifest to the storefront server in response to receiving the device token;
          receive the playback token from the client; and
          send the one or more cryptographic keys to the client.

11. The system of claim 10, wherein the manifest comprises a synchronized multimedia integration language (SMIL) file.

12. The system of claim 10, wherein the one or more cryptographic keys allow the client to authenticate itself to a file server from which the media is streamed.

13. The system of claim 10, wherein the one or more cryptographic keys allow the client to decrypt the encrypted media.

14. The system of claim 10, wherein said first plurality of processing instructions is further configured to direct said first processor to:
    send updated device capability information to the license server with the playback token.

15. The system of claim 10, wherein said first plurality of processing instructions is further configured to direct said first processor to:
    send device capability information to the license server, performed before the sending of the device token to the storefront server.

16. The system of claim 10, wherein customer ID parameters are sent with the device token to the storefront server.

17. The system of claim 10, wherein the manifest and playback token are obtained by the storefront server from the license server after the storefront server sends the device token received from the client, to the license server.

18. The system of claim 10, wherein the first plurality of processing instructions are further configured to direct said first processor to:
 cache the playback token and manifest at the client after the receipt from the storefront server.

\* \* \* \* \*